(12) United States Patent  
Michalovich et al.

(10) Patent No.: US 11,687,430 B2  
(45) Date of Patent: Jun. 27, 2023

(54) METHOD AND APPARATUS FOR OFFLOADING FUNCTIONAL DATA FROM AN INTERCONNECT COMPONENT

(71) Applicant: NXP USA, INC., Austin, TX (US)

(72) Inventors: Benny Michalovich, Austin, TX (US); Ron Bar, Ramat-Hasharon (IL); Eran Glickman, Rishon le Zion (IL); Dmitriy Shurin, Netaniya (IL)

(73) Assignee: NXP USA, Inc., Austin, TX (US)

( * ) Notice: Subject to any disclaimer, the term of this patent is extended or adjusted under 35 U.S.C. 154(b) by 9 days.

(21) Appl. No.: 17/445,418

(22) Filed: Aug. 19, 2021

(65) Prior Publication Data

US 2021/0397529 A1    Dec. 23, 2021

Related U.S. Application Data

(62) Division of application No. 14/897,671, filed as application No. PCT/IB2013/054999 on Jun. 18, 2013, now Pat. No. 11,126,522.

(51) Int. Cl.
  *G06F 11/30*  (2006.01)
  *G06F 11/36*  (2006.01)
  *G06F 11/22*  (2006.01)
  *G06F 13/28*  (2006.01)

(52) U.S. Cl.
  CPC ........ *G06F 11/3006* (2013.01); *G06F 11/221* (2013.01); *G06F 11/3027* (2013.01); *G06F 11/3656* (2013.01); *G06F 13/28* (2013.01); *Y02D 10/00* (2018.01)

(58) Field of Classification Search
  CPC .............. G06F 11/3006; G06F 11/221; G06F 11/3027; G06F 11/3656; G06F 13/28; Y02D 10/00
  USPC .......................................................... 714/43
  See application file for complete search history.

(56) References Cited

U.S. PATENT DOCUMENTS

| | | | |
|---|---|---|---|
| 6,715,058 B1 * | 3/2004 | Smith ..................... | G06F 13/28 711/217 |
| 8,108,583 B2 * | 1/2012 | Clayton .............. | G06F 11/1004 710/33 |
| 2004/0225758 A1 * | 11/2004 | Moyer ................ | G06F 13/1673 710/22 |
| 2006/0143526 A1 * | 6/2006 | So ......................... | G06F 11/267 714/E11.16 |

(Continued)

*Primary Examiner* — James C Kerveros

(57) ABSTRACT

An interconnect offload component arranged to operate in an offloading mode, and a memory access component for enabling access to a memory element for functional data transmitted over a debug network of a signal processing device.

In the offloading mode the interconnect offload component is arranged to receive functional data from an interconnect client component for communication to a destination component, and forward at least a part of the received functional data to a debug network for communication to the destination component via the debug network.

The memory access component is arranged to receive a debug format message transmitted over the debug network, extract functional data from the received debug format message, said functional data originating from an interconnect client component for communication to a memory element, and perform a direct memory access to the memory element comprising the extracted functional data.

9 Claims, 8 Drawing Sheets

(56) References Cited

U.S. PATENT DOCUMENTS

2007/0265822 A1\* 11/2007 Mathewson ........ G06F 11/3636
703/22

\* cited by examiner

METHOD AND APPARATUS FOR OFFLOADING FUNCTIONAL DATA FROM AN INTERCONNECT COMPONENT

CROSS-REFERENCE TO RELATED APPLICATIONS

This application is a Divisional of U.S. application Ser. No. 14/897,671 filed Jun. 18, 2013.

FIELD OF THE INVENTION

This invention relates to a method and apparatus for offloading functional data from an interconnect component, and in particular to an interconnect offload component and method for offloading functional data from an interconnect component, and a memory access component and method for enabling access to a memory element for functional data transmitted over a debug network of a signal processing device.

BACKGROUND OF THE INVENTION

Advanced signal processing devices such as System-on-Chip (SoC) devices are increasingly being required to provide greater performance. One limiting factor for the performance of such signal processing devices is the means of communication and signalling between the different components within the signal processing devices. In particular, a key limiting factor for the performance of such signal processing devices is the speed at which an interconnect component of a signal processing device is able to convey data etc. between the various other components of the signal processing device.

Furthermore, in safety critical applications such as, for example, automotive applications and the like, it is desirable and often essential that in case of an error or malfunction the system is able to be put into a 'safe' mode of operation. However, in case of an error or malfunction occurring within (or in relation to) the interconnect component of a signal processing device, implementing such a safe mode can be difficult if at all possible.

SUMMARY OF THE INVENTION

The present invention provides an interconnect offload component, a signal processing device comprising at least one such interconnect offload component, a method of offloading function data from an interconnect component of a signal processing device, a memory access component, a signal processing device comprising at least one such memory access component, and a method of enabling access to at least one memory element for functional data transmitted over a debug network of a signal processing device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
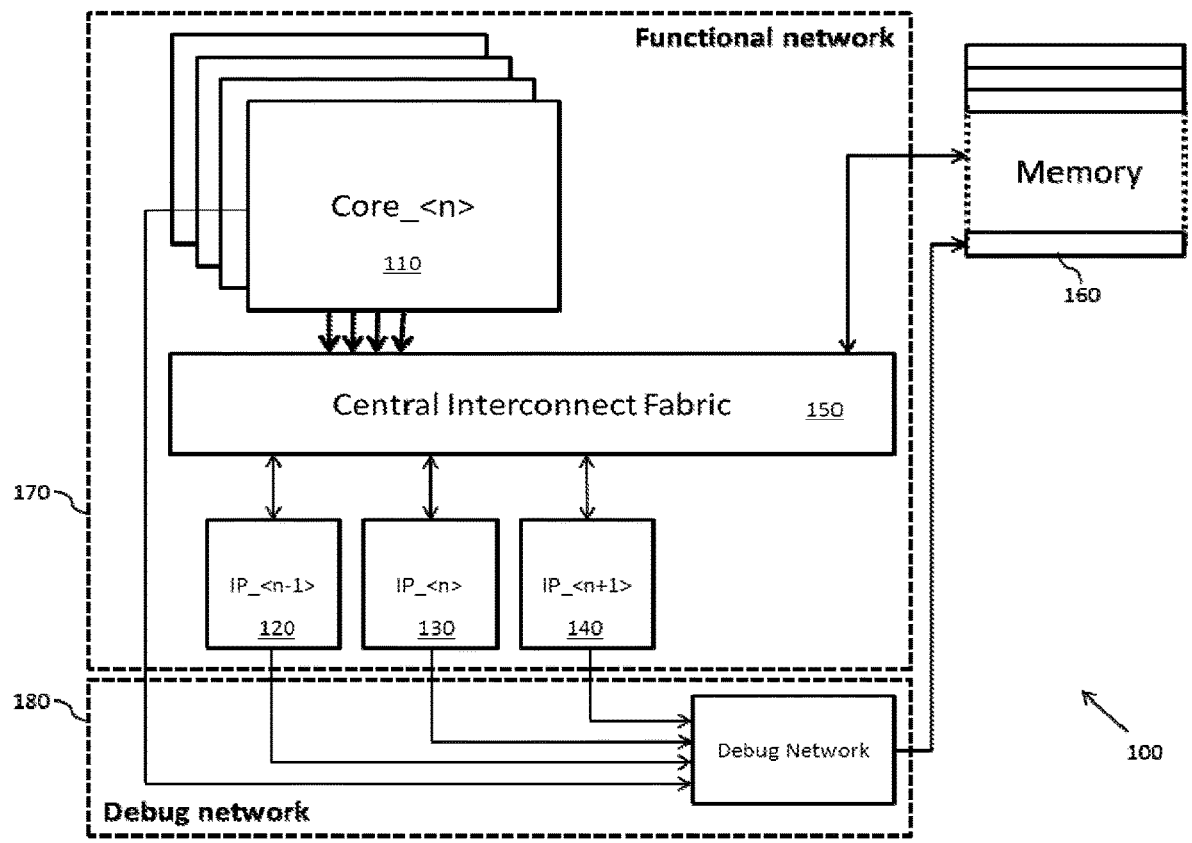
FIG. 1 illustrates a simplified block diagram of an example of a signal processing device.

The present invention will now be described with reference to the accompanying drawings in which there is illustrated an example of a signal processing device within which an example of the present invention has been implemented. However, it will be appreciated that the present invention is not limited to the specific examples herein described with reference to the accompanying drawings, and various variations and/or modifications may be made without departing from the inventive concepts.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

According to some examples of a first aspect of the present invention there is provided an interconnect offload component arranged to operate in at least an offloading mode in which the interconnect offload component is arranged to receive functional data from at least one interconnect client component of a signal processing device for communication to at least one destination component, and forward at least a part of the received functional data to at least one debug network of the signal processing device for communication to the at least one destination component via the at least one debug network.

In this manner, functional data may be offloaded from the interconnect component of the signal processing device onto the debug network, thereby reducing the load on the interconnect component and enabling the overall performance of the signal processing device to be improved.

In one optional example, the interconnect offload component may be arranged to, when operating in the offloading mode: receive functional data from the at least one interconnect client component for communication to at least one destination component; determine whether the received functional data comprises non-coherent data; and forward at least a part of the received functional data to the at least one debug network for communication to the at least one destination component if the at least part of the received functional data comprises non-coherent data.

In one optional example, the interconnect offload component may be arranged to forward at least a part of the received functional data to the at least one interconnect component of the signal processing device for communication to the at least one destination component if the at least part of the received functional data comprises coherent data.

In one optional example, the interconnect offload component may be arranged to determine whether the received functional data comprises non-coherent data based at least partly on a destination address for the received functional data.

In one optional example, the interconnect offload component may be arranged to compare the destination address of the received functional data to at least one offload address and to determine whether the received functional data comprises non-coherent data based at least partly on said comparison.

In one optional example, the at least one offload address may be configurable.

In one optional example, the at least one offload address may be stored within at least one memory element internal to the interconnect offload component and configurable via a host bus.

In one optional example, the at least one offload address may be stored within at least one memory element external to the interconnect offload component, and to which the interconnect offload component is operably coupled.

In one optional example, the interconnect offload component may be arranged to, when operating in the offloading mode: receive functional data from the at least one interconnect client component for communication to at least one destination component; determine whether to forward at least a part of the received functional data to the at least one debug network for communication to the at least one destination component based at least partly on a set of rules; and forward at least a part of the received functional data to the at least one debug network for communication to the at least one destination component if so determined.

In one optional example, the interconnect offload component may be arranged to determine whether to forward at least a part of the received functional data to the at least one debug network based at least partly on a set of rules comprising at least one of the following for the received functional data being matched to at least one preconfigured value:
  a destination address;
  a transaction size;
  a safe mode indication;
  a coherence indication;
  an offloading enabled indication; and
  a debug network fully powered indication.

In one optional example, interconnect offload component may be arranged to determine whether the received functional data comprises non-coherent data based at least partly on a non-coherent data indication from an external hardware component.

In one optional example, the interconnect offload component may be arranged to, when operating in the offloading mode: receive at least one direct memory access transaction from at least one direct memory access component of the signal processing device for communication to at least one memory component; and forward at least a part of the received direct memory access transaction to the at least one debug network of the signal processing device for communication to the at least one memory component via the at least one debug network.

In one optional example, the interconnect offload component may be arranged to, when operating in the offloading mode: receive at least one data packet comprising functional data from the at least one interconnect client component for communication to at least one destination component; forward a received payload component of the at least one data packet to the at least one debug network for communication to the at least one destination component; and forward a header component of the received at least one data packet to the at least one interconnect component for communication to the at least one destination component.

In one optional example, the interconnect offload component may be arranged to convert data to be forwarded to the at least one debug network into a debug message format.

In one optional example, the interconnect offload component may be configurable to enable and disable the offloading mode; the interconnect offload component being arranged to forward the received functional data to the at least one interconnect component of the signal processing device upon the offloading mode being disabled.

In one optional example, the interconnect offload component may be further arranged to receive debug data from the at least one interconnect client component and to forward the debug data to the at least one debug network upon the offloading mode being disabled.

In one optional example, the at least one destination component may comprise at least one memory component.

In one optional example, the interconnect offload component may be implemented within an integrated circuit device comprising at least one die within a single integrated circuit package.

According to some examples of a second aspect of the present invention there is provided a signal processing device comprising at least one interconnect offload component of the first aspect of the present invention.

According to some examples of a third aspect of the present invention there is provided a method of offloading functional data from an interconnect component of a signal processing device. The method comprises receiving functional data from at least one interconnect client component of the signal processing device for communication to at least one destination component, and forwarding at least a part of the received functional data to at least one debug network of the signal processing device for communication to the at least one destination component via the at least one debug network.

According to some examples of a fourth aspect of the present invention there is provided a memory access component for enabling access to at least one memory element for functional data transmitted over a debug network of a signal processing device. The memory access component is arranged to receive at least one debug format message transmitted over the debug network, extract functional data from the received at least one debug format message, said functional data originating from at least one interconnect client component of the signal processing device for communication to at least one memory element, and perform a direct memory access to the at least one memory element comprising the extracted functional data.

In one optional example, the memory access component may be arranged to: decode the received at least one debug form message into a payload and message attributes; determine whether the payload comprises functional data to be written to memory based at least partly on the decoded message attributes; and perform a direct memory access to the at least one memory element comprising at least a part of the decoded payload, upon determination that the payload comprises functional data to be written to memory.

In one optional example, the memory access component may be arranged to determine whether the payload comprises functional data to be written to memory based at least partly on a type code within the decoded message attributes.

In one optional example, the memory access component may be arranged to determine configuration attributes for performing the direct memory access based at least partly on the decoded message attributes.

In one optional example, the memory access component may be arranged to lookup configuration attributes from a software configurable memory element based at least partly on the decoded message attributes.

In one optional example, the memory access component may be arranged to lookup an address in memory from the software configurable memory element, and to perform the direct memory access to said address in memory.

In one optional example, the decoded message attributes may comprise a virtual memory address and the memory access component is arranged to lookup a physical address in memory from the software configurable memory element, and to perform the direct memory access to said physical address in memory.

In one optional example, the memory access component may be further arranged to generate an end of transmission signal upon receipt of a direct memory access acknowledgment signal from the at least one memory element.

In one optional example, the memory access component may be implemented within an integrated circuit device comprising at least one die within a single integrated circuit package.

According to some examples of a fifth aspect of the present invention there is provided a signal processing device comprising at least one memory access component of the fourth aspect of the present invention.

According to some examples of a sixth aspect of the present invention there is provided a method of enabling access to at least one memory element for functional data transmitted over a debug network of a signal processing device. The method comprises receiving at least one debug format message transmitted over the debug network, extracting functional data from the received at least one debug format message, said functional data originating from at least one interconnect client component of the signal processing device for communication to the at least one memory element, and performing a direct memory access to at least one memory element comprising the extracted functional data.

Referring now to FIG. 1, there is illustrated a simplified block diagram of an example of a signal processing device 100. Signal processing devices typically comprise one or more 'master' components, such as the processing cores 110 illustrated in FIG. 1. In addition to processing cores, a signal processing device may comprise other master components such as direct memory access (DMA) components etc. The signal processing device 100 further comprise various 'slave' components, illustrated generally in FIG. 1 as IP_<n−1> 120, IP_<n> 130 and IP_<n+1> 140. Such slave component may comprise, for example, random access memory (RAM) components, peripheral components, etc. Communication between the various master components (e.g. the processing cores 110) and the various slave components 120, 130, 140 is typically implemented via one or more interconnect components, such as the central interconnect fabric 150 illustrated in FIG. 1. The interconnect component(s) 150 typically also provides access to external memory elements, such as the memory element(s) 160 illustrated in FIG. 1. The master and slave components 110, 120, 130, 140 and the interconnect component (i.e. the central interconnect fabric 150 in the illustrated example) of the signal processing device 100 may be considered as a 'functional' network 160 of the signal processing device 100 in that they provide the operational functionality of the system, with the interconnect component 150 interconnecting the various functional network nodes.

With the increased trend towards multi-core processing devices, the functional network must be fully coherent since different parts of the processing system are required to share data, and as such each part must have access to the most updated version of the data. Memory coherence is an issue that affects the design of signal processing devices in which two or more processors or cores share a common area of memory. In multiprocessor (or multicore) systems, there are two or more processing elements running at the same time, and so it is possible that they simultaneously access the same memory location. Provided none of them change the data in this location, they can share it indefinitely and cache it as they please. However, as soon as one updates data in this location, any cached instances of this data being accessed by other processing elements will become out-of-date. Consequently, some scheme is required to notify all the processing elements of changes to shared data in order to maintain the coherency between instances of the shared data.

In the example illustrated in FIG. 1, coherency in the functional network is achieved through the use of the central interconnect fabric component 150 as a buffer between all of the components 110, 120, 130, 140 and outside memory element(s) 160. Having such a central interconnect fabric component 150 used for all traffic means that performance of the signal processing device 100 is only as good as its ability to make optimal use of the central interconnect fabric component 150. The central interconnect fabric component 150 is thus a potential bottleneck of performance and it limits the use cases possible. However, the central interconnect fabric component 150 is very complex, and any increase in performance or addition of ports means a major increase in size and power.

Since the central interconnect fabric component 150 is used for all types of data, coherent (i.e. potentially multi-instanced/shared) and non-coherent (i.e. for which coherency is not an issue—at least at a given point in time), changing the profile of the data transferred may not help. Another serious drawback of this architecture is the failure to create an alternative to the main path or a creation of a "safe mode" from an individual component to an end point such as a memory device. If there is some kind of failure that prevents an individual component full or partial access to the coherency fabric, there is no way to correct this catastrophic error.

The rising complexity of System on Chip (SoC) type devices has also advanced the complexity of possible issues limiting performance or causing erroneous behaviour. In order to overcome such issues and possibly remedy them even on the end consumer premises, debugging solutions have been integrated to grant visibility into a functioning device. One such solution commonly found in most large SoCs is the use of a separate high speed debug network spanning the entire device that is activated when debug is necessary, and typically uses a debug protocol to convey debug information from inside the SoC to, say, an external memory element or directly to an external debug tool. One example of such a standard debug protocol used for embedded systems is the Nexus or IEEE-ISTO 5001-2003 standard debugging interface.

Referring back to FIG. 1, the signal processing device 100 comprises such a debug network 180. The debug network 180 is conventionally powered down during normal functional operation of the signal processing device 100 in order to save power, and is powered up when there is a need to send debug information out of the signal processing device 100 into, for example, the memory element 160, or any other media that can hold and analyse the information.

The debug network 180 is non-coherent by nature, and the data sent by the various components under debug is added to information about the source, destination and other control information to assist with the analysis. The data from the individual interconnect client components 110, 120, 130, 140, is aggregated into packets called traces and sent out using a high speed link.

Figure 2:
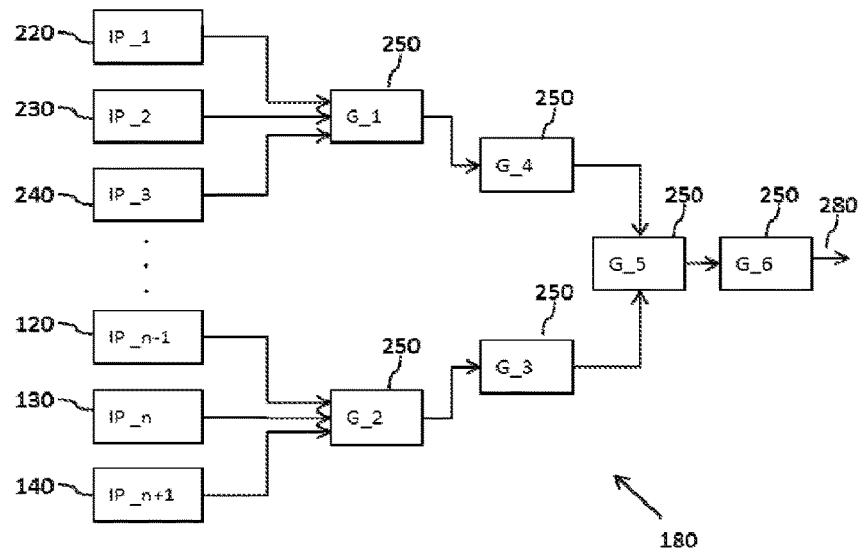
FIG. 2 illustrates a simplified block diagram of an example of a conventional implementation of a debug network.

FIG. 2 illustrates a simplified block diagram of an example of a conventional implementation of the debug network 180. The debug network 180 in the illustrated example is built in a layered architecture. A series of gaskets 250 are instantiated between the different interconnect client components 120, 130, 140, 220, 230 and 240 to create a layered network leading to high speed output 280. The gaskets collect traces from 'upstream' sources and provide synchronization, arbitration and storage of the received traces. These gaskets 250 may also provide conversion of received data into various bus formats for accesses to external memory and other high speed links such as a SERDES (Serializer/Deserializer) link. The architecture may be modular to provide conformity, flexibility and reuse between various applications.

The inventors of the present invention have recognised that debug network resources already implemented in signal processing devices are powered down and generally redundant during normal functional operation of the signal processing devices. Accordingly, it is proposed to offload functional data (i.e. data that is required to be communicated between components of the signal processing device during normal functional operation) from the functional (coherent) network onto the debug (non-coherent) network in order to help reduce the load on the functional network, and thus to help improve the overall performance of the signal processing device.

For example, referring back to FIG. 1, the debug network 180 may be transformed into a network capable of offloading non-coherent data write transactions from components connected to it, thus reducing the load on the functional (coherent) network and increasing performance of the signal processing device 100. The availability of an alternative path for data may also provide for a "safe mode" capable of bypassing the central interconnect fabric 150 in case of an error or malfunction occurring within (or in relation to) the interconnect component 150.

Figure 3:
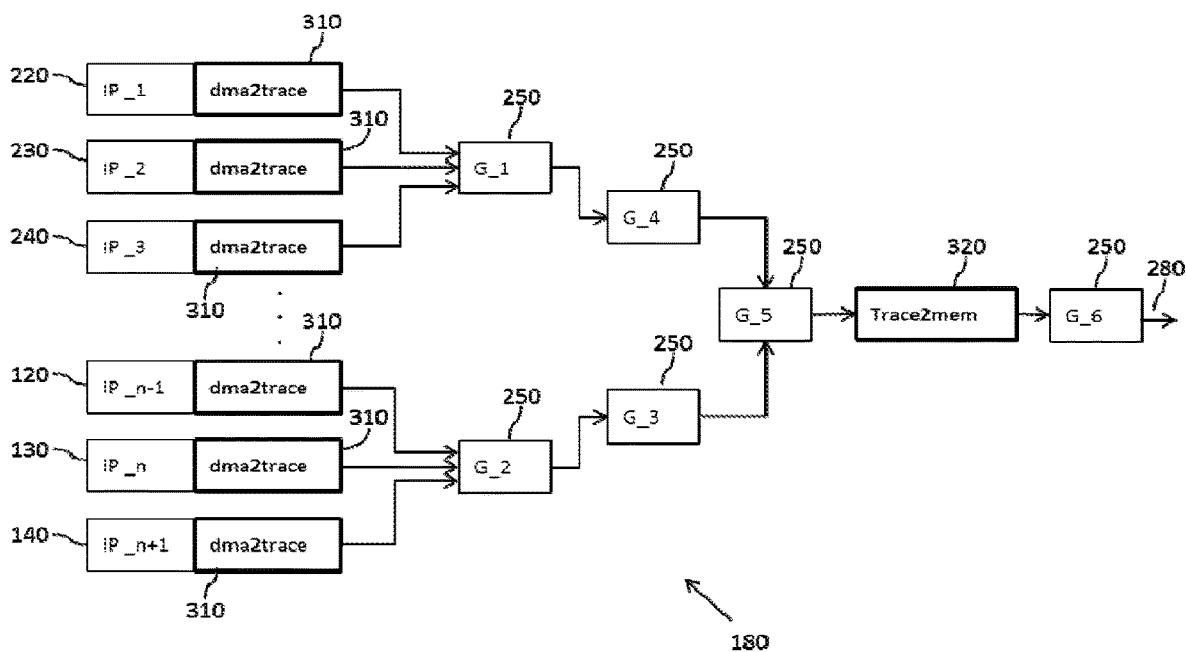
FIG. 3 illustrates a simplified block diagram of an alternative example of an implementation of the debug network.

FIG. 3 illustrates a simplified block diagram of an example of an implementation of the debug network 180 adapted in accordance with some examples of the present invention. In the example illustrated in FIG. 3, interconnect offload components (dma2trace) 310 are implemented between interconnect client components, such as the interconnect client components 120, 130, 140, 220, 230 and 240, and the debug network 180. Each interconnect offload component 310 is arranged to operate in at least an offloading mode in which the interconnect offload component 310 is arranged to receive functional data from the respective interconnect client component for communication to at least one destination component, and to forward at least a part of the received functional data to the debug network 180 for communication to the respective destination component(s) via the debug network 180.

Figure 4:
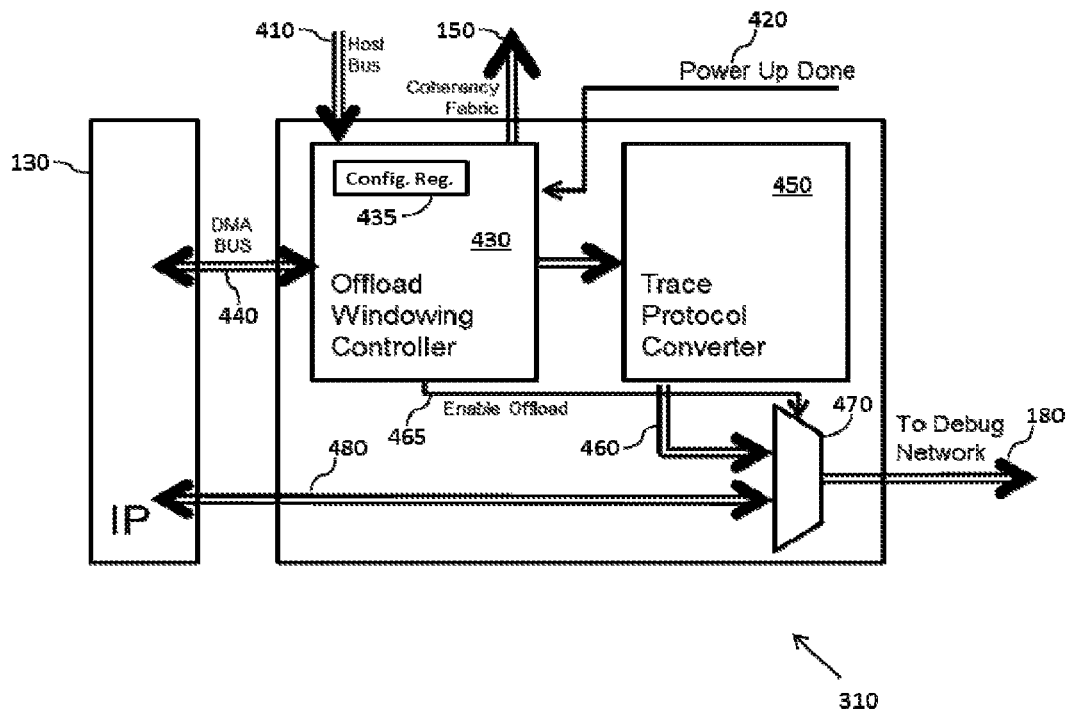
FIG. 4 illustrates a simplified block diagram of an example of an interconnect offload component.

FIG. 4 illustrates a simplified block diagram of an example of an interconnect offload component, such as may be used to implement one or more of the interconnect offload components 130 illustrated in FIG. 3. The interconnect offload component 130 is arranged to receive functional data from one or more interconnect client components, such as the interconnect client component 130 as illustrated in the example in FIG. 4, for communication to at least one destination component, and to forward at least a part of the received functional data to the debug network 180 for communication to the respective destination component(s) via the debug network 180.

The interconnect offload component 310 may be instantiated as a wrapper (add-on gasket) to the respective interconnect client component 130. In the illustrated example, an offloading mode of the interconnect offload component 310 is arranged to be enabled/disable via a host bus 410 for example as configured by software executing on one or more of the processing cores 110 in the signal processing device 100 of FIG. 1. When the offloading mode of the interconnect offload component 310 is enabled, it may be necessary for the debug network 180 to be powered up, since the debug network 180 would typically be powered off during normal functional operation of the signal processing device 100 to reduce power consumption. As such, in some examples of the present invention the software may be arranged to power up the debug network 180 substantially simultaneously to enabling the offloading mode of the interconnect offload component 310. In the illustrated example, the interconnect offload component 310 is arranged to receive a debug network power up acknowledgement signal 420 to prevent functional data from being forwarded to the debug network 180 when the debug network 180 has not been (fully) powered up.

In the illustrated example, an offload windowing controller 430 of the interconnect offload component 310 is arranged to receive direct memory access (DMA) transactions from the (or each) interconnect client component 130, for example via DMA bus 440. When the offloading mode of the interconnect offload component 310 is enabled (and when the debug network power up acknowledgement signal 420 confirms that the debug network 180 is powered up), the offload windowing controller 430 reads a destination address for a received DMA transaction and compares the destination address to one or more offload addresses. The offload addresses may comprise addresses in a memory, such as in external memory element 160 where, for example, software executing on one or more of the processing cores 110 directs non-coherent data, and the (or each) individual interconnect client component 130 is configured to use such addresses for non-coherent data accordingly. The offload addresses may be held within one or more memory elements such as the configurable register 435 and be configured for example by software executing on one or more of the processing cores 110 via the host bus 410. In this manner, the offload windowing controller 430 of the interconnect offload component 310 may be configured to hold a range of addresses for which there will be no coherent write transactions.

If the destination address of the received DMA transaction matches an offload address, the DMA transaction is passed from the offload windowing controller 430 to a trace protocol converter 450. The trace protocol converter 450 converts the DMA transaction into a debug message format (trace), for example adding appropriate frame headers, cyclic redundancy check values and other controls required. The converted DMA transaction is then forwarded via a DMA transaction bus 460 on to the debug network 180 for distribution to, say, the memory element 160 (as described in more detail below). In this manner, the DMA transaction is routed via the debug network 180 instead of via the functional interconnect component of the signal processing device 100 (i.e. the central interconnect fabric 150 in the example of FIG. 1) and may subsequently be converted back into the original functional data before being written to the memory element 160 as described in greater detail below. As a result, non-coherent DMA transactions may be offloaded from the central interconnect fabric 150, reducing the load on the thereon and enabling the overall performance of the signal processing device 100 to be improved.

Conversely, if the destination address of the received DMA transaction does not match an offload address, and/or if the offloading mode of the interconnect offload component 310 is not enabled, and/or if the debug network power up acknowledgement signal 420 indicates that the debug network 180 is not (fully) power up, the offload windowing controller 430 of the interconnect offload component 310 simply forwards the received DMA transaction on to the functional interconnect component (central interconnect fabric) 150 of the signal processing device 100 for distribution to, say, the memory component 160 in a conventional manner. In this manner, the coherency of coherent DMA transactions may be maintained in a conventional manner (e.g. by using the central interconnect fabric component 150 as a buffer between the various components of the signal processing device 100).

In the illustrated example, normal trace bus connectivity between the (or each) interconnect client component 130 and the debug network 180 may be maintained when the offloading mode of the interconnect offload component 310 is disabled by way of a multiplexing component 470. The multiplexing component 470 is controllable by way of an enable offload signal 475 output by the offload windowing controller 430 to selectively couple to the debug network 180 either a trace bus 480 to/from the (or each) interconnect client component 130 or the DMA transaction bus 460 output by the trace protocol converter 450.

As described above, when operating in the offloading mode the interconnect offload component 310 in the illustrated example is arranged to receive functional data comprising DMA transactions from at least one DMA component (i.e. the interconnect client component 130) of the signal processing device 100 and determine whether received functional data (e.g. a received DMA transaction) comprises non-coherent data, and forward the received functional data to the debug network 180 for communication to a destination component (e.g. the external memory element 160) if the received functional data comprises non-coherent data. Conversely, when the offloading mode is disabled the interconnect offload component 310 in the illustrated example is arranged to forward the received functional data to the interconnect component (central interconnect fabric) 150 of the signal processing device 100 for communication to the destination component if the received functional data comprises coherent data.

In the above described example, the interconnect offload component 310 is arranged to determine whether the received functional data comprises non-coherent data based at least partly on a destination address for the received functional data. For example, the interconnect offload component 310 may be arranged to compare the destination address of the received functional data to offload addresses configured by software and to determine whether the received functional data comprises non-coherent data based at least partly on said comparison. In the illustrated example, at least one offload address is stored within a memory element 435 internal to the interconnect offload component 310 and configurable by software via the host bus 410. It is contemplated that the offload address(es) may alternatively be stored within one or more memory element(s) (not shown) external to the interconnect offload component 310, and to which the interconnect offload component 310 is operably coupled.

The present invention is not limited to the offloading of functional data based on a determination that the functional data comprises non-coherent data, such as due to a destination address of the received functional data matching an offload address. For example, it is contemplated that the interconnect offload component 310 may additionally/alternatively be arranged to determine whether to forward at least a part of the received functional data to the debug network 180 for communication to a destination component based at least partly on an offload signal received from an external hardware component (not shown). Such an indication may be received via, for example, the host bus 410 or via a dedicated input signal (not shown). In some examples, such an offload signal may be used to enable, for example, functional data to be offloaded from the central interconnect fabric 150 onto the debug network 180 when the signal processing device is required to operate in a safe mode and/or an error/malfunction has been detected within (or in relation to) the central interconnect fabric 150.

It is further contemplated that the interconnect offload component 310 may additionally/alternatively be arranged to determine whether to forward at least a part of the received functional data to the debug network 180 for communication to a destination component based at least partly on a set of rules and/or offsets. Such a set of rules and/or offsets may comprise, by way of example, one or more of the following for the received functional data being matched to one or more pre-configured values:

a destination address;
a transaction size;
a safe mode indication;
a coherence indication;
an offloading enabled indication; and
a debug network fully powered indication.

In some examples of the present invention, the interconnect offload component 310 may be arranged to receive at least one data packet comprising functional data from the interconnect client component 130, forward a payload component of the received data packet to the debug network 180 for communication to a destination component, and forward a header component of the received data packet to the interconnect component 150 for communication to the destination component. For example, communication controller traffic is often made up of data packets comprising two parts: the header containing control information about the packet type, data/control attributes; and the payload itself. The header is small but it must be conveyed in a coherent manner since multiple processing cores 110 may wish to read it. The header also holds a pointer to the location of the payload itself. The payload is non-coherent and thus can be written to memory using the debug network as described above, saving most of the function interconnect bandwidth required for the whole transaction.

Referring back to FIG. 3, a memory access component (Trace2mem) 320 is operably coupling to the debug network 180 and arranged to receive debug format messages (traces) transmitted over the debug network 180, extract functional data from the received debug format messages, and perform a direct memory access to a memory element, such as the memory element 160 illustrated in FIG. 1, comprising the extracted functional data. As illustrated in FIG. 3, the memory access component 320 may be instantiated 'downstream' of the interconnect offload components 310 within the debug network structure, enabling it to make use of the aggregation characteristics of the debug network architecture. In this manner, the memory access component 320 is able to open the aggregated messages into the individual data sent from the individual interconnect client components 120, 130, 140, 220, 230 and 240 and create a DMA transaction for each individual component's data, writing the individual component data to memory.

In the illustrated example, a single memory access component 320 is located towards the downstream end of the debug network 180, enabling the single memory access component 320 to receive debug format messages transmitted over the debug network 180 from all of the interconnect client components 120, 130, 140, 220, 230 and 240. However, it will be appreciated that the invention is not limited to a single memory access component 320 being so located, and it is contemplated that one or more memory access components 320 may be located at different points within the debug network 180 such that the memory access components 320 are arranged to receive debug format messages from at least some of the interconnect client components 120, 130, 140, 220, 230 and 240 of the signal processing device 100.

Figure 5:
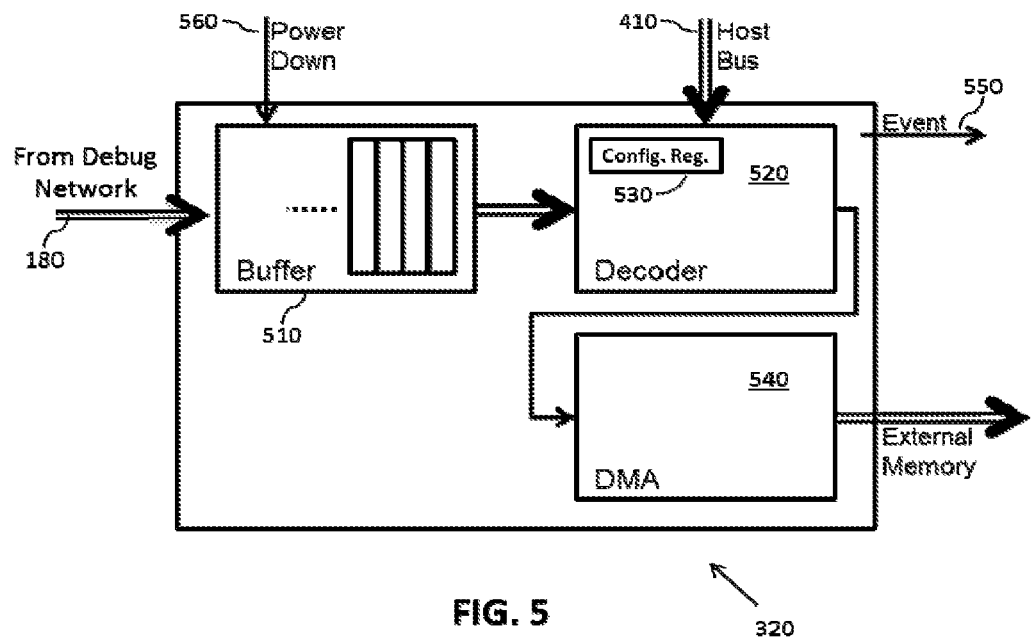
FIG. 5 illustrates a simplified block diagram of an example of a memory access component.

FIG. 5 illustrates a simplified block diagram of an example of a memory access component, such as may be used to implement the memory access component 320 illustrated in FIG. 3. The memory access component 320 is arranged to receive debug format messages (e.g. traces) transmitted over the debug network 180, extract functional data from the received debug format messages, said functional data originating from at least one interconnect client component of the signal processing device 100 for communication to a memory element such as the memory element 160, and perform a direct memory access to the memory element comprising the extracted functional data.

Figure 6:
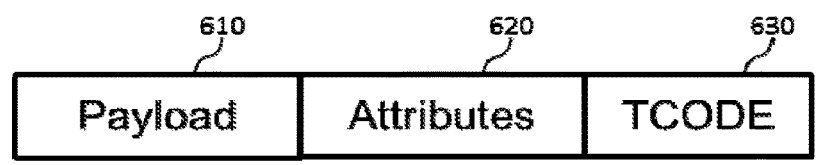
FIG. 6 illustrates a simplified example of a debug format message.

In the illustrated example, the received debug format messages enter a buffer 510 which enables the system to be kept at high speed. A decoder 520 comprises a memory element 530 configurable via host bus 410, for example by software executing on one or more of the processing cores 110. The memory element 530 holds configuration information such as the DMA transaction attributes (e.g. base addresses, end addresses, counters, etc. for automatically generating DMA transactions). Once a debug format message is inside the buffer 510, the decoder 520 reads it and decodes it into payload and trace attributes. For example, FIG. 6 illustrates a simplified example of a debug format message 600. In the illustrated example, the debug format message 600 comprises a payload 610, trace attributes 620 and a type code (TCODE) 630.

The TCODE typically indicates the type of trace and can be vendor specific or public. If a vendor specific TCODE is used for identifying the debug format message as comprising functional data (as opposed to more typical debug/trace data), the TCODE may be defined such that it does not overlap with the predefined TCODEs of the debug protocol, and the offloading of functional data may be performed alongside the debug network 180 being used for the communication of more conventional debug/trace data. However, this is not mandatory and any TCODE can be used to identify debug format messages comprising functional data.

Upon identifying that a debug format message inside the buffer 510 comprises functional data to be written to memory, the decoder 520 may use the trace attributes 620 to access relevant/appropriate DMA configuration attributes held within the memory element 530, and derive the necessary attributes required to automatically generate a DMA write transaction. For example, the trace attributes within the debug format message may comprise, say, a virtual address and size of data for writing the functional data to memory, and the configuration attributes held within the memory element 520 may comprise a physical memory block address to which this virtual address is mapped. The decoder 520 may then provide the payload 610 comprising the functional data and the derived DMA attributes to a DMA component 540, which performs the DMA write transaction to the physical memory block address, for example within the external memory element 160 in the example illustrated in FIG. 1.

In the illustrated example, the memory access component 320 is further arranged to output an "end of transaction" (EOT) event indication 550. The EOT event indication 550 is a combination of reaching the end of the DMA transaction and receiving acknowledgement that the data has been written by, for example, the external memory controller for the memory element 160. Software executing on one or more of the processing cores 110 may subsequently clear the configuration attributes held within the memory element 530 once an EOT indication 550 is raised by the memory access component 320, and a status register holding a status "done" bit for every address is set.

The memory access component 320 may be powered down, for example by way of power down control signal 560, as part of the debug network 180, and powered up only if the offloading mode is enabled.

Advantageously, the examples hereinbefore described comprise a hardware solution that can be integrated into an existing SoC design, making use of an existing debug network to offload non-coherent data and the like to increase SoC performance, and/or to provide an alternative means of communicating data between components in a safe mode of operation. The implemented hardware in the illustrated examples is made up of two components at each end of the debug network.

Figure 7:
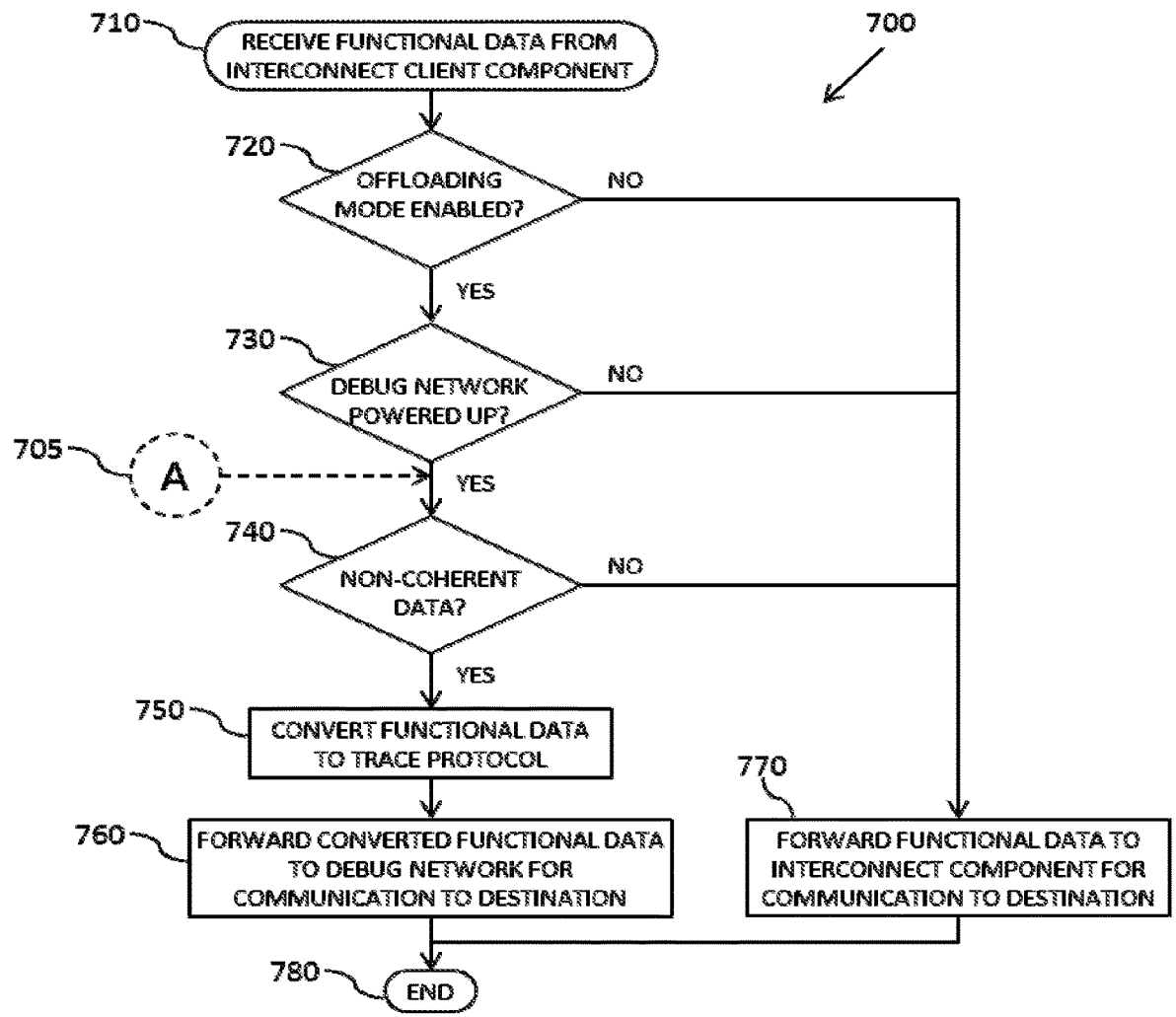
FIG. 7 illustrates a simplified flowchart of an example of a method of offloading functional data from an interconnect component of a signal processing device.

Referring now to FIG. 7, there is illustrated a simplified flowchart 700 of an example of a method of offloading functional data from an interconnect component of a signal processing device, such as may be implemented within the interconnect offload component 310 of FIG. 4. The method starts at 710 with the receipt of functional data from an interconnect client component for communication to at least one destination component. Next, at 720, it is determined whether an offloading mode is enabled. If it is determined that the offloading mode is not enabled, the method moves on to 770 where the received functional data is forwarded to the interconnect component of the signal processing device for communication to the at least one destination component in a conventional manner, and the method ends at 780. However, if it is determined that the offloading mode is enabled, the method moves on to 730 where it is determined whether a debug network of the signal processing device is powered up. If it is determined that the debug network is not powered up, the method moves on to 770 where the received functional data is forwarded to the interconnect component of the signal processing device for communication to the at least one destination component in a conventional manner, and the method ends at 780. However, if it is determined that the debug network is powered up, the method moves on to 740 where it is determined whether the received data comprises non-coherent data. If it is determined that the received functional data does not comprise non-coherent data, the method moves on to 770 where the received functional data is forwarded to the interconnect component of the signal processing device for communication to the at least one destination component in a conventional manner, and the method ends at 780. However, if it is determined that the received functional data does comprise non-coherent data, the method moves on to 750 where the non-coherent functional data is converted into an appropriate trace protocol for transmission over the debug network as a debug format message. Next, at 760, the converted functional data is forwarded to the debug network for communication to the at least one destination component. The method then ends at 780.

Figure 8:
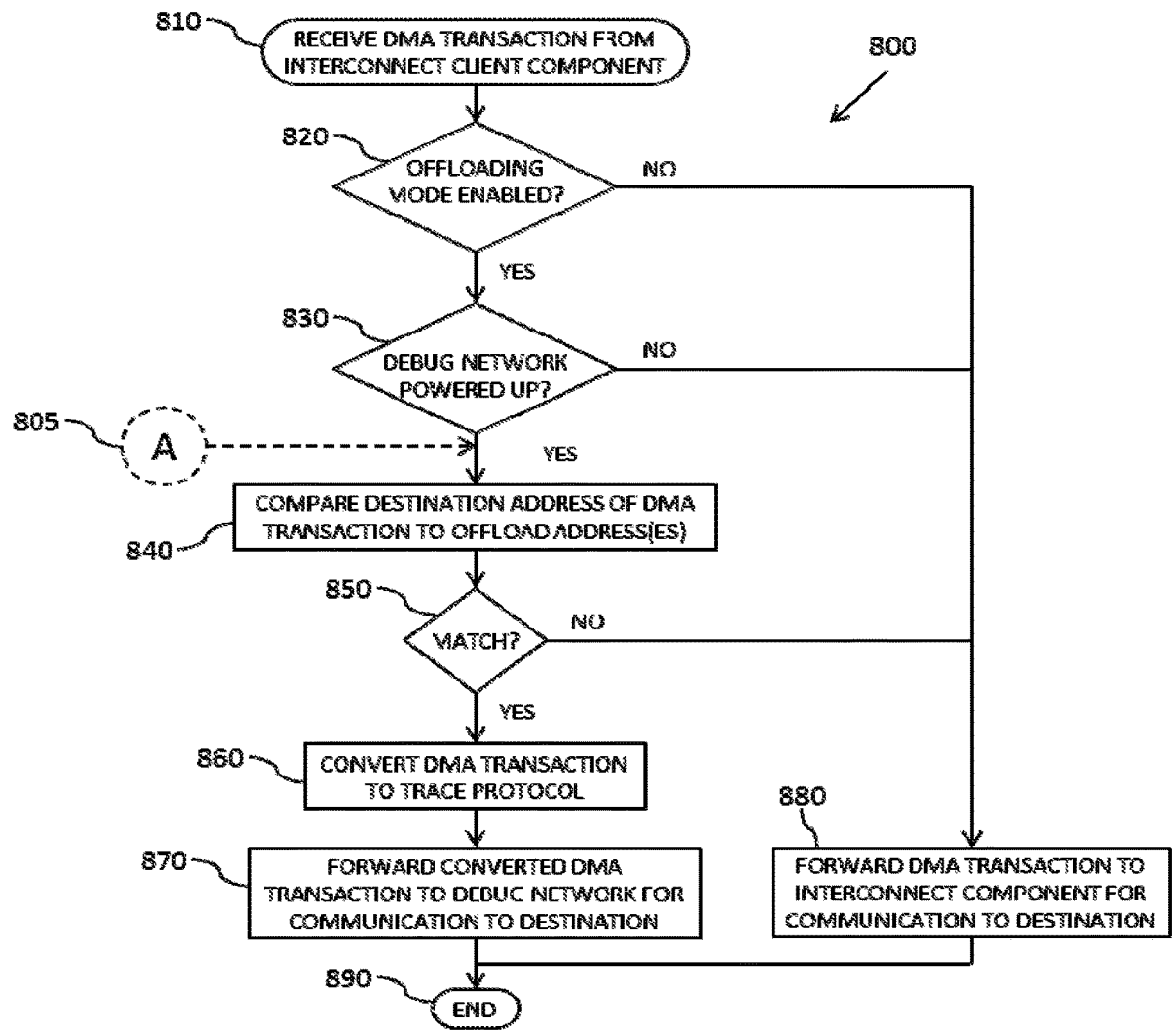
FIG. 8 illustrates a simplified flowchart of an alternative example of a method of offloading functional data from an interconnect component of a signal processing device.

Referring next to FIG. 8, there is illustrated a simplified flowchart 800 of an alternative example of a method of offloading functional data from an interconnect component of a signal processing device, such as may additionally/alternatively be implemented within the interconnect offload component 310 of FIG. 4. The method starts at 810 with the receipt of functional data comprising a DMA transaction from an interconnect client component for communication to at least one destination component. Next, at 820, it is determined whether an offloading mode is enabled. If it is determined that the offloading mode is not enabled, the method moves on to 880 where the received DMA transaction is forwarded to the interconnect component of the signal processing device for communication to the at least one destination component in a conventional manner, and the method ends at 890. However, if it is determined that the offloading mode is enabled, the method moves on to 830 where it is determined whether a debug network of the signal processing device is powered up. If it is determined that the debug network is not powered up, the method moves on to 880 where the received DMA transaction is forwarded to the interconnect component of the signal processing device for communication to the at least one destination component in a conventional manner, and the method ends at 890. However, if it is determined that the debug network is powered up, the method moves on to 840 where a destination address of the DMA transaction is compared to one or more offload addresses. Next, at 850, it is determined whether the destination address of the DMA transaction matches an offload address. If it is determined that the destination address of the DMA transaction does not match an offload address, the method moves on to 880 where the received DMA transaction is forwarded to the interconnect component of the signal processing device for communication to the at least one destination component in a conventional manner, and the method ends at 890. However, if it is determined that the destination address of the DMA transaction does matches an offload address, the method moves on to 860 where the DMA transaction is converted into an appropriate trace protocol for transmission over the debug network as a debug format message. Next, at 870, the converted DMA transaction is forwarded to the debug network for communication to the at least one destination component. The method then ends at 890.

Figure 9:
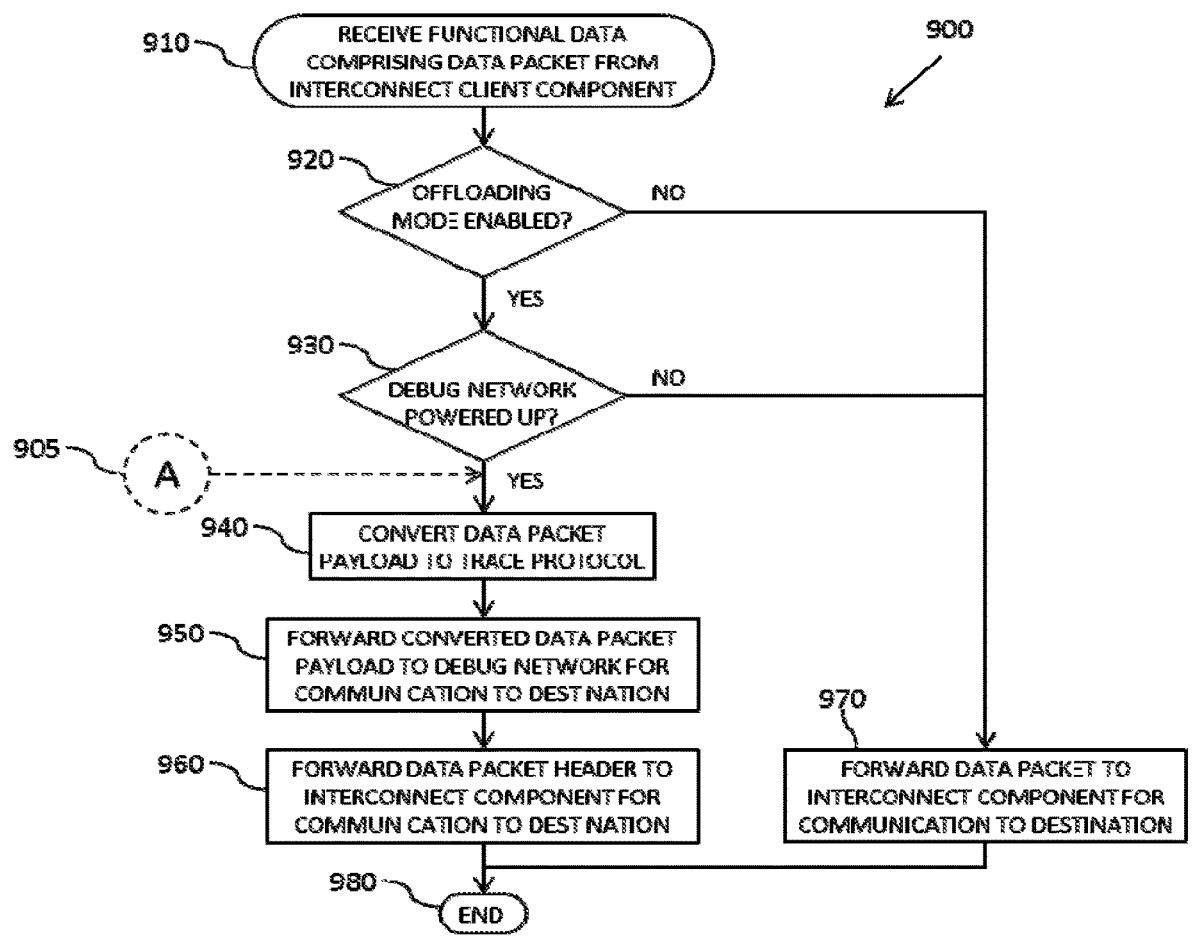
FIG. 9 illustrates a simplified flowchart of a further alternative example of a method of offloading functional data from an interconnect component of a signal processing device.

Referring next to FIG. 9, there is illustrated a simplified flowchart 900 of a further alternative example of a method of offloading functional data from an interconnect component of a signal processing device, such as may additionally/alternatively be implemented within the interconnect offload component 310 of FIG. 4. The method starts at 910 with the receipt of functional data comprising a data packet from an interconnect client component for communication to at least one destination component. Next, at 920, it is determined whether an offloading mode is enabled. If it is determined that the offloading mode is not enabled, the method moves on to 970 where the received data packet is forwarded to the interconnect component of the signal processing device for communication to the at least one destination component in a conventional manner, and the method ends at 980. However, if it is determined that the offloading mode is enabled, the method moves on to 930 where it is determined whether a debug network of the signal processing device is powered up. If it is determined that the debug network is not powered up, the method moves on to 970 where the received data packet is forwarded to the interconnect component of the signal processing device for communication to the at least one destination component in a conventional manner, and the method ends at 980. However, if it is determined that the debug network is powered up, the method moves on to 940 where the received data packet is converted into an appropriate trace protocol for transmission over the debug network as a debug format message, and, the converted DMA transaction is forwarded to the debug network for communication to the at least one destination component at 950. The header of the received data packet is forwarded to the interconnect component of the signal processing device for communication to the at least one destination component in a conventional manner at 960, and the method ends at 980.

Figure 10:
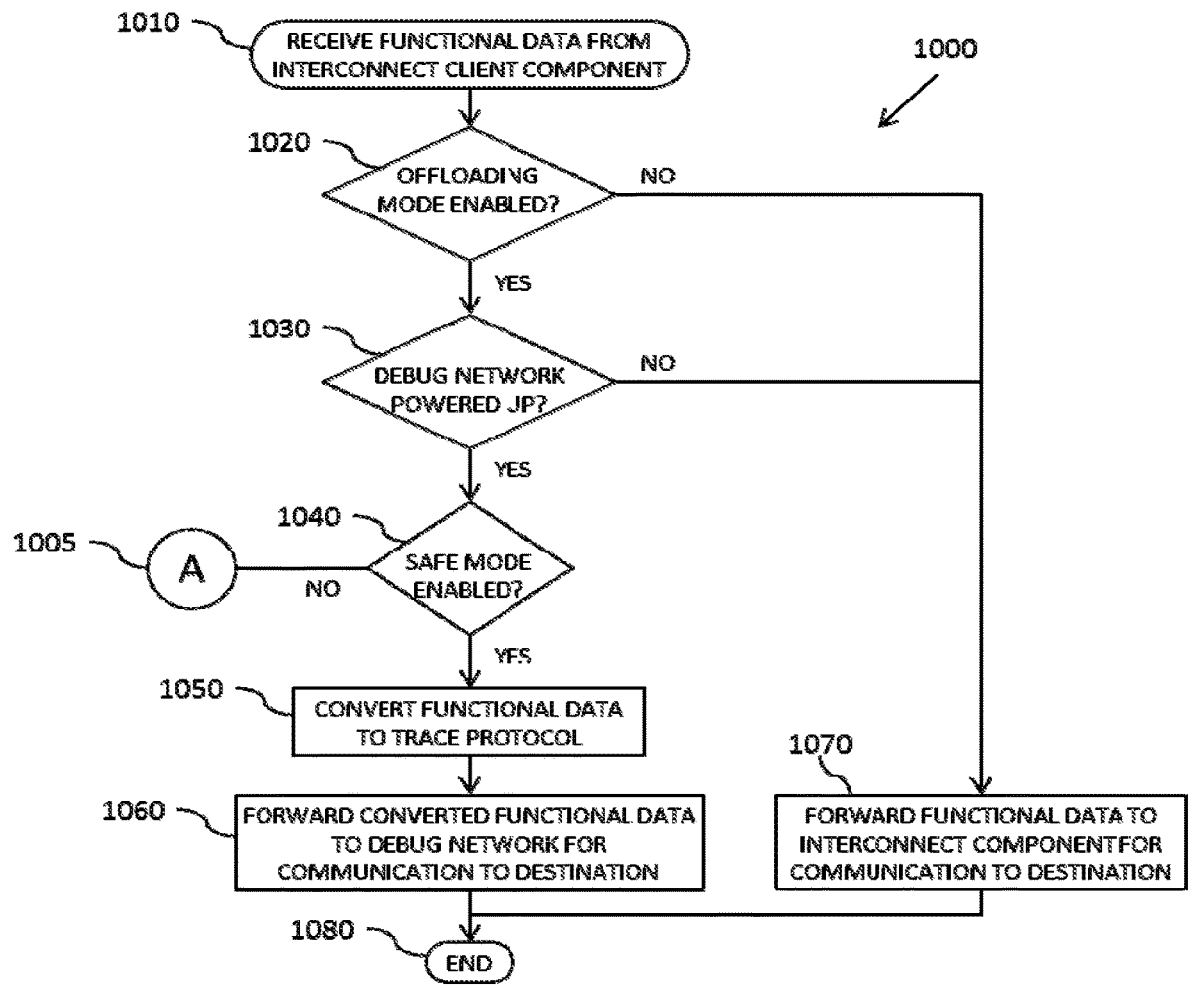
FIG. 10 illustrates a simplified flowchart of a still further alternative example of a method of offloading functional data from an interconnect component of a signal processing device.

Referring next to FIG. 10, there is illustrated a simplified flowchart 1000 of a still further alternative example of a method of offloading functional data from an interconnect component of a signal processing device, such as may additionally/alternatively be implemented within the interconnect offload component 310 of FIG. 4. The method starts at 1010 with the receipt of functional data from an interconnect client component for communication to at least one destination component. Next, at 1020, it is determined whether an offloading mode is enabled. If it is determined that the offloading mode is not enabled, the method moves on to 1070 where the received data packet is forwarded to the interconnect component of the signal processing device for communication to the at least one destination component in a conventional manner, and the method ends at 1080. However, if it is determined that the offloading mode is enabled, the method moves on to 1030 where it is determined whether a debug network of the signal processing device is powered up. If it is determined that the debug network is not powered up, the method moves on to 1070 where the received data packet is forwarded to the interconnect component of the signal processing device for communication to the at least one destination component in a conventional manner, and the method ends at 1080. However, if it is determined that the debug network is powered up, the method moves on to 1040 where it is determined whether a safe mode is enabled in which functional data is to be offloaded from the interconnect component to the debug network by default. If it is determined that the safe mode is enabled, the method moves on to 1050 where the received functional data is converted into an appropriate trace protocol for transmission over the debug network as a debug format message, and, the converted functional data is forwarded to the debug network for communication to the at least one destination component at 1060. The method then ends at 1080. Referring back to 1040, if it is determined that the safe mode is not enabled, the method may move on to determine whether or not the received functional data should be offloaded from the interconnect component to the debug network based on any other suitable criteria, as illustrated generally at 1005. For example, the method may move on to one or more of 705, 805 or 905 in FIGS. 8 to 9.

Figure 11:
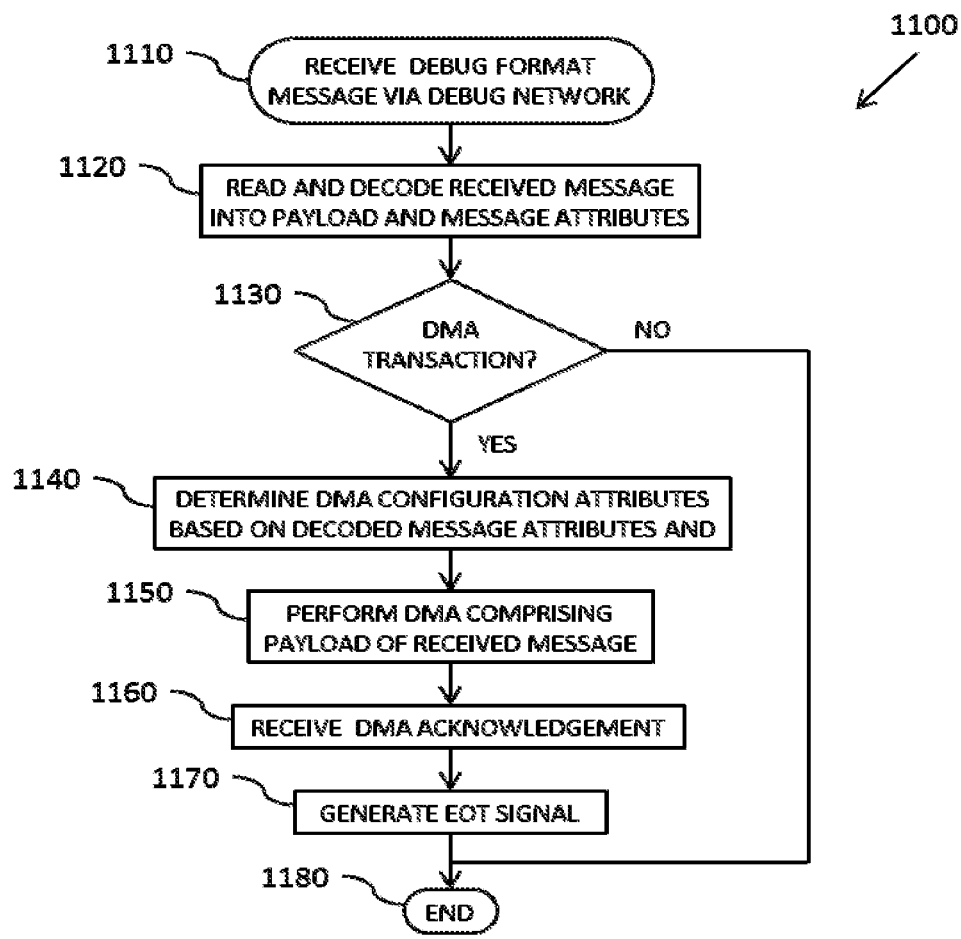
FIG. 11 illustrates a simplified flowchart of an example of a method of enabling access to at least one memory element for functional data transmitted over a debug network of a signal processing device.

Referring now to FIG. 11, there is illustrated a simplified flowchart 1100 of an example of a method of enabling access to at least one memory element for functional data transmitted over a debug network of a signal processing device, such as may be implemented within the memory access component 320 of FIG. 5. The method starts at 1110 with the receipt of a debug format message transmitted over the debug network. Next, at 1120, the received debug format message is read and decoded into payload and trace attributes. The method then moves on to 1130 where it is determined whether a DMA transaction is required to write the payload of the received debug format message to the at least one memory element, for example based on a TCODE of the received debug format message. If it is determined that not DMA transaction is required, the method stops at 1180. However, if it is determined that a DMA transaction is required, the method moves on to 1150 where the trace attributes of the received debug format message are used to derive the necessary attributes required to automatically generate a DMA write transaction. For example, the trace attributes may be used to access relevant/appropriate DMA configuration attributes held within a memory element. Next, at 1150, a DMA transaction is performed comprising the payload of the received debug format message. In the illustrated example, following receipt of a DMA acknowledgement at 1160, an "end of transaction" (EOT) event indication is generated at 1170, and the method ends at 1180.

At least some parts of the invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the example interconnect offload component 310 illustrated in FIG. 4, separate offload windowing controller and trace protocol converter components 430, 450 are illustrated. However, it will be appreciated that the functionality of these two components herein described may equally be combined into a single functional block, or divided amongst more than two functional blocks. Similarly, in the example memory access component 320 illustrated in FIG. 5, separate buffer, decoder and DMA components 510, 520, 530 are illustrated. However, it will be appreciated that the functionality of these three components herein described may equally be combined into any number of functional blocks.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, it is contemplated that the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A memory access component for enabling access to at least one memory element for functional data transmitted over a debug network of a signal processing device; the memory access component being arranged to:
   receive at least one debug format message transmitted over the debug network;
   extract functional data from the received at least one debug format message, said functional data originating from at least one interconnect client component of the signal processing device for communication to at least one memory element; and
   perform a direct memory access to the at least one memory element comprising the extracted functional data.

2. The memory access component of claim 1, wherein the memory access component is arranged to:
   decode the received at least one debug form message into a payload and message attributes;
   determine whether the payload comprises functional data to be written to memory based at least partly on the decoded message attributes; and
   perform a direct memory access to the at least one memory element comprising at least a part of the decoded payload, upon determination that the payload comprises functional data to be written to memory.

3. The memory access component of claim 2, wherein the memory access component is arranged to determine whether the payload comprises functional data to be written to memory based at least partly on a type code within the decoded message attributes.

4. The memory access component of claim 1, wherein the memory access component is arranged to determine configuration attributes for performing the direct memory access based at least partly on the decoded message attributes.

5. The memory access component of claim 4, wherein the memory access component is arranged to lookup configuration attributes from a software configurable memory element based at least partly on the decoded message attributes.

6. The memory access component of claim 5, wherein the memory access component is arranged to lookup an address in memory from the software configurable memory element, and to perform the direct memory access to said address in memory.

7. The memory access component of claim 6, wherein the decoded message attributes comprise a virtual memory address and the memory access component is arranged to lookup a physical address in memory from the software configurable memory element, and to perform the direct memory access to said physical address in memory.

8. The memory access component of claim 1, wherein the memory access component is further arranged to generate an end of transmission signal upon receipt of a direct memory access acknowledgment signal from the at least one memory element.

9. The memory access component of claim 1, wherein the memory access component is implemented in an integrated circuit device comprising at least one die within a single integrated circuit package.

\* \* \* \* \*